US010937347B2

(12) United States Patent
Chu et al.

(10) Patent No.: US 10,937,347 B2
(45) Date of Patent: Mar. 2, 2021

(54) METHOD AND COMPONENT FOR SIGNAL DETECTION AS WELL AS DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yifang Chu, Beijing (CN); Hao Zhu, Beijing (CN); Xin Duan, Beijing (CN); Jun Guo, Beijing (CN); Chengqi Zhou, Beijing (CN); Jieqiong Wang, Beijing (CN); Ming Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/618,917

(22) PCT Filed: Jun. 4, 2018

(86) PCT No.: PCT/CN2018/089741
§ 371 (c)(1),
(2) Date: Dec. 3, 2019

(87) PCT Pub. No.: WO2018/223914
PCT Pub. Date: Dec. 13, 2018

(65) Prior Publication Data
US 2020/0143721 A1  May 7, 2020

(30) Foreign Application Priority Data
Jun. 9, 2017  (CN) .......................... 201710434610.6

(51) Int. Cl.
| G09G 3/00 | (2006.01) |
| G09G 5/00 | (2006.01) |
| H04L 1/24 | (2006.01) |

(52) U.S. Cl.
CPC ............ *G09G 3/006* (2013.01); *G09G 5/006* (2013.01); *H04L 1/24* (2013.01); *G09G 2310/0275* (2013.01); *G09G 2310/08* (2013.01)

(58) Field of Classification Search
CPC ...... G09G 3/006; G09G 2310/08; H04L 1/20; H04L 1/24; H04L 1/244
See application file for complete search history.

(56) References Cited

U.S. PATENT DOCUMENTS

2009/0174438 A1* 7/2009 Lin ........................ H03K 17/22
327/77
2010/0315396 A1  12/2010 Weng et al.
(Continued)

FOREIGN PATENT DOCUMENTS

| CN | 102930837 A | 2/2013 |
| CN | 103544928 A | 1/2014 |

(Continued)

OTHER PUBLICATIONS

"International Search Report and Written Opinion of the International Searching Authority with English language translation", International Application No. PCT/CN2018/089741, dated Aug. 16, 2018, 15 pp.

(Continued)

*Primary Examiner* — Laurence J Lee
(74) *Attorney, Agent, or Firm* — Myers Bigel, P.A.

(57) ABSTRACT

The present disclosure relates to a signal detection method and component, as well as a display device. The display device includes a timing controller and a source driver. The (Continued)

source driver receives a test code stream from the timing controller, which is obtained through encoding of an initial code stream by the timing controller, the initial code stream representing a test signal. The source driver decodes the test code stream. When the decoded code stream is different from the initial code stream, configuration information of the source driver is acquired. The configuration information is transmitted to the timing controller, and is adjusted according to reference information of the timing controller when it does not match with the reference information. The source driver receives adjusted configuration information transmitted by the timing controller, and then receives a subsequently transmitted signal according to the adjusted configuration information.

19 Claims, 6 Drawing Sheets

(56) References Cited

U.S. PATENT DOCUMENTS

| | | |
|---|---|---|
| 2013/0038582 A1 | 2/2013 | Yen |
| 2014/0226025 A1* | 8/2014 | Han ................... G09G 5/003 348/177 |
| 2017/0084236 A1 | 3/2017 | Wu et al. |
| 2019/0266964 A1 | 8/2019 | Pan et al. |

FOREIGN PATENT DOCUMENTS

| | | |
|---|---|---|
| CN | 105185336 A | 12/2015 |
| CN | 106128406 A | 11/2016 |

OTHER PUBLICATIONS

"First Office Action and English language translation", CN Application No. 201710434610.6, dated Oct. 30, 2020, 15 pp.

* cited by examiner

METHOD AND COMPONENT FOR SIGNAL DETECTION AS WELL AS DISPLAY DEVICE

CROSS REFERENCE TO RELATED APPLICATIONS

The present application is the U.S. national phase entry of PCT/CN2018/089741, with an international filing date of Jun. 4, 2018, which claims the benefit of Chinese Patent Application No. 201710434610.6, filed on Jun. 9, 2017, the entire disclosures of which are incorporated herein by reference.

FIELD

The present disclosure relates to the field of displays, and more particularly to a method and component for signal transmission, as well as a related display device.

BACKGROUND

Point-to-point (P2P) interface is a communication interface between a timing controller (T-CON) and a source driver (SD) within a display panel of a liquid crystal display. When data signals representing an image to be displayed are transmitted through a P2P interface, errors may occur in the data signals for some reason. For example, data signals may be subjected to external interferences, or poor quality of transmission equipment may result in distortion of the data signal. When the external interferences or distortion reaches a certain level, errors occur in the data signal. This further affects the effect of the image displayed by the display device.

SUMMARY

According to the embodiment of the present disclosure, there is provided a signal detection method and component, as well as a display device.

According to one aspect of the embodiment of the present disclosure, there is provided a method for signal detection in a display device. The display device comprises a timing controller and a source driver. The method is applied to the timing controller. The method comprises: transmitting a test code stream to the source driver, the test code stream being obtained through encoding of an initial code stream by the timing controller, the initial code stream representing a test signal; in response to reception of configuration information of the source driver from the source driver, determining whether the configuration information matches with pre-set reference information of the timing controller, wherein the reception of the configuration information indicates detection by the source driver that a decoded code stream is different from the initial code stream, the decoded code stream being obtained by decoding the test code stream by the source driver; and when the configuration information is determined to be different from the pre-set reference information, adjusting the configuration information according to the reference information, and transmitting the adjusted configuration information to the source driver so that the source driver receives a subsequently transmitted signal according to the adjusted configuration information.

In an embodiment, the configuration information comprises an identity identifier and a transmission rate of the source driver.

In an embodiment, the reception of the configuration information of the source driver from the source driver comprises receiving the configuration information at the highest sampling frequency allowed by the timing controller.

In an embodiment, after transmitting a test code stream to the source driver, the method further comprises: receiving a positive acknowledgment message from the source driver, the positive acknowledgment message indicating detection by the source driver that the decoded code stream is the same as the initial code stream; and in response to the positive acknowledgment message, initiating the transmission of a data signal.

In an embodiment, the initial code stream is a binary random test code stream.

In an embodiment, the binary random test code stream is a pseudo-random PRBS7 code stream.

According to another aspect of the embodiment of the present disclosure, there is provided a method for signal detection in a display device. The display device comprises a timing controller and a source driver. The method is applied to a source driver chip. The method comprises: receiving a test code stream of the timing controller, the test code stream being obtained through encoding of an initial code stream by the timing controller, the initial code stream representing a test signal; decoding the test code stream to obtain a decoded code stream; detecting whether the decoded code stream is the same as the initial code stream; when the decoded code stream is detected to be different from the initial code stream, acquiring configuration information of the source driver; transmitting the configuration information to the timing controller so as to adjust the configuration information according to pre-set reference information of the timing controller when the configuration information does not match with the reference information; and receiving the adjusted configuration information transmitted by the timing controller, and receiving a subsequently transmitted signal according to the adjusted configuration information.

In an embodiment, the configuration information comprises an identity identifier and a transmission rate of the source driver.

In an embodiment, after detecting whether the decoded code stream is the same as the initial code stream, the method further comprises: when the decoded code stream is the same as the initial code stream, generating a positive acknowledgment message and transmitting the positive acknowledgment message to the timing controller.

According to a further aspect of the embodiment of the present disclosure, there is provided a first signal detection component. The first signal detection component is applied for a timing controller in a display device. The display device further comprises a source driver. The first signal detection component comprises a transmitter, a receiver, a determiner and an adjuster. The transmitter is configured to transmit a test code stream to the source driver, and the test code stream is obtained through encoding of an initial code stream by the timing controller, the initial code stream representing a test signal. The receiver is configured to receive information from the source driver, the information comprises configuration information of the source driver, and reception of the configuration information indicates detection by the source driver that a decoded code stream is different from the initial code stream, and the decoded code stream is obtained by decoding the test code stream by the source driver. The determiner is configured to, in response to reception of the configuration information; determine whether the configuration information matches with pre-set reference information of the timing controller. The adjuster is configured to, when the configuration information does not match with the pre-set configuration information, adjust the configuration information according to the reference information, the adjusted configuration information being transmitted to the source driver so that the source driver receives a subsequently transmitted signal according to the adjusted configuration information.

In an embodiment, the configuration information comprises an identity identifier and a transmission rate of the source driver.

In an embodiment, the receiver is further configured to receive the configuration information at the highest sampling frequency allowed by the receiver.

In an embodiment, the receiver is further configured to receive a positive acknowledgment message from the source driver, the positive acknowledgment message indicating detection by the source driver that the decoded code stream is the same as the initial code stream. The transmitter is further configured to, in response to the positive acknowledgment message, initiate the transmission of the data signal.

In an embodiment, the initial code stream is a binary random test code stream.

In an embodiment, the binary random test code stream is a pseudo-random PRBS7 code stream.

According to a yet aspect of the embodiment of the present disclosure, there is provided a second signal detection component. The second signal detection component is applied for a source driver in a display device. The display device further comprises a timing controller. The second signal detection component comprises a receiver, a decoder, a detector, an acquirer and a transmitter. The receiver is configured to receive a test code stream from the timing controller in the display device, and the test code stream is obtained through encoding of an initial code stream by the timing controller, the initial code stream representing a test signal. The decoder is configured to decode the test code stream to obtain a decoded code stream. The detector is configured to detect whether the decoded code stream is the same as the initial code stream. The acquirer is configured to, when the decoded code stream is detected to be different from the initial code stream, acquire configuration information of the source driver. The transmitter is configured to transmit the configuration information to the timing controller so that the timing controller adjusts the configuration information according to pre-set reference information of the timing controller when it is determined that the configuration information does not match with the reference information. The receiver is further configured to receive the adjusted configuration information transmitted by the timing controller, and receive a subsequently transmitted signal according to the adjusted configuration information.

In an embodiment, the second signal detection component further comprises a generator. The generator is configured to generate a positive acknowledgment message when the detector detects that the decoded code stream is the same as the initial code stream. The transmitter is configured to transmit the positive acknowledgment message to the timing controller.

According to a yet aspect of the embodiment of the present disclosure, there is provided a display device comprising a timing controller and a source driver. The timing controller comprises a first signal detection component according to the embodiments of the present disclosure as stated above. The source driver comprises a second signal detection component according to the embodiments of the present disclosure as stated above.

According to a yet aspect of the embodiment of the present disclosure, there is provided a computer readable storage medium, which stores instructions. The instructions, when executed on a computer, cause the computer to perform the signal detection method according to the embodiment of the present disclosure as stated above.

BRIEF DESCRIPTION OF DRAWINGS

In order to more clearly illustrate the technical solutions in one or more embodiments of the present disclosure, the drawings used in the description of the embodiments will be briefly described below. Obviously, the drawings in the following description are only some of the embodiments of the present application, and those skilled in the art may obtain other drawings based on these drawings without paying any inventive effort.

DETAILED DESCRIPTION

For bettering clarifying the objective, technical solutions and advantages of the present application, the embodiments of the present disclosure will be further described in detail with reference to the drawings.

In related art, a source driver adjusts its relevant parameters based on a test code stream before receiving data signals. Since the adjustment is tentative, a source driver chip may need to perform adjustment several times to adapt the relevant parameters to transmission requirements. This leads to multiple transmission of redundant information such as the test code stream, which lowers the transmission efficiency of data signals.

Figure 1:
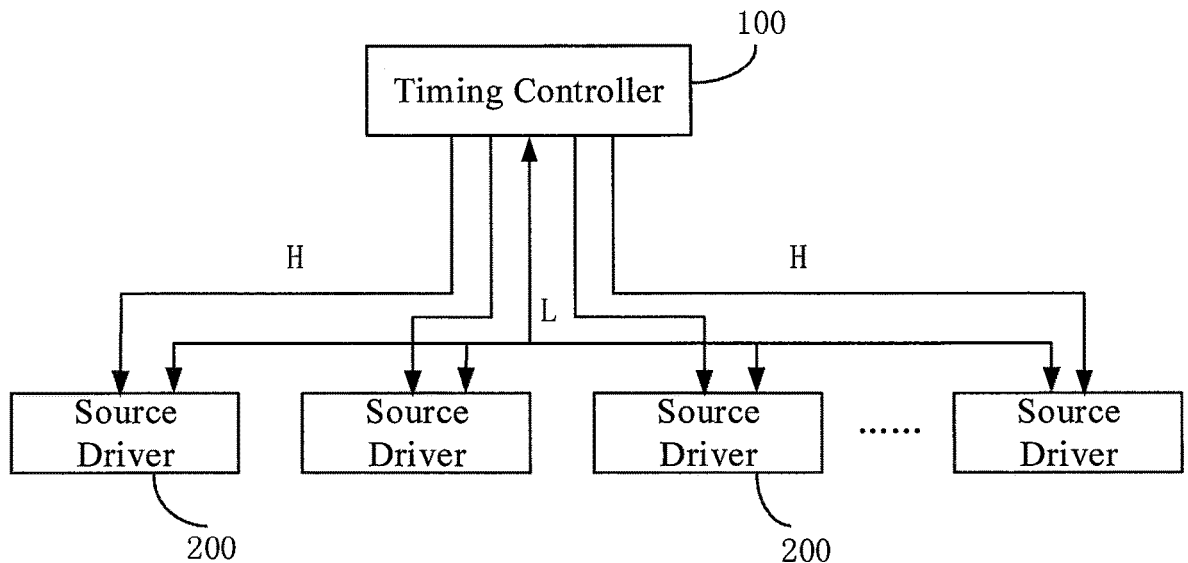
FIG. 1 is a schematic view showing an exemplary environment in which various embodiments described herein may be implemented.

FIG. 1 shows a schematic view showing an exemplary environment in which various embodiments described herein may be implemented. The environment may be a display device comprising a display panel and a drive circuit for driving the display panel. The drive circuit may comprise a timing controller, a gate driver and a source driver. FIG. 1 schematically shows a timing controller 100 and source drivers 200 in a display device, which are operably coupled with each other.

The display device herein may be any product or component having a display function such as a liquid crystal display device, electronic paper, an organic light-emitting diode (OLED) display device, a mobile phone, a tablet, a TV (such as a liquid crystal TV having a backlight brightness control system), a display, a laptop, a digital photo frame and a navigator.

The source driver utilizes a voltage corresponding to a data signal received from the timing controller 100 to drives a data line of a display panel to display an image.

The timing controller 100 may be connected with the source drivers 200 via a plurality of high-speed signal lines H in a one-to-one relationship for transmitting a data signal, for example, an image data signal of an image to be displayed. A common interconnection may also be formed between the timing controller 100 and a plurality of source drivers 200 via a low-speed signal line L for transmitting clock calibration data.

The timing controller 100 and the source driver may be configured to conduct signal detection before transmission of a data signal so as to test the signal transmission quality. In one or more embodiments, the timing controller 100 encodes an initial code stream representing a test signal to obtain a test code stream segment, such as a binary test code stream. The timing controller 100 transmits the test code stream to the source driver 200. The source driver 200 decodes the received test code stream to obtain a decoded code stream. When the decoded code stream is consistent with the initial code stream, this indicates that the signal transmission between the timing controller 100 and the source driver 200 meets the quality requirement. Then the timing controller 100 starts to transmit a data signal to the source driver 200 so as to drive the display panel to display an image.

In related art, when the decoded code stream is different from the initial code stream, this indicates that the source driver 200 does not correctly receive the signal from the timing controller 100. At this time, the source driver 200 adjusts transmission-related parameters, and after the adjustment, the timing controller 100 re-transmits the test code stream to the source driver. The timing controller 100 does not start transmission of the data signal until the decoded code stream is consistent with the initial code stream.

In the above process, the adjustment made by the source driver 200 is tentative and blind, so the source driver chip may need to perform multiple adjustments to make relevant parameters adapt to the transmission requirement. This results in multiple transmission of redundant information like a test code stream, which lowers the transmission efficiency of the data signal.

Figure 2A:
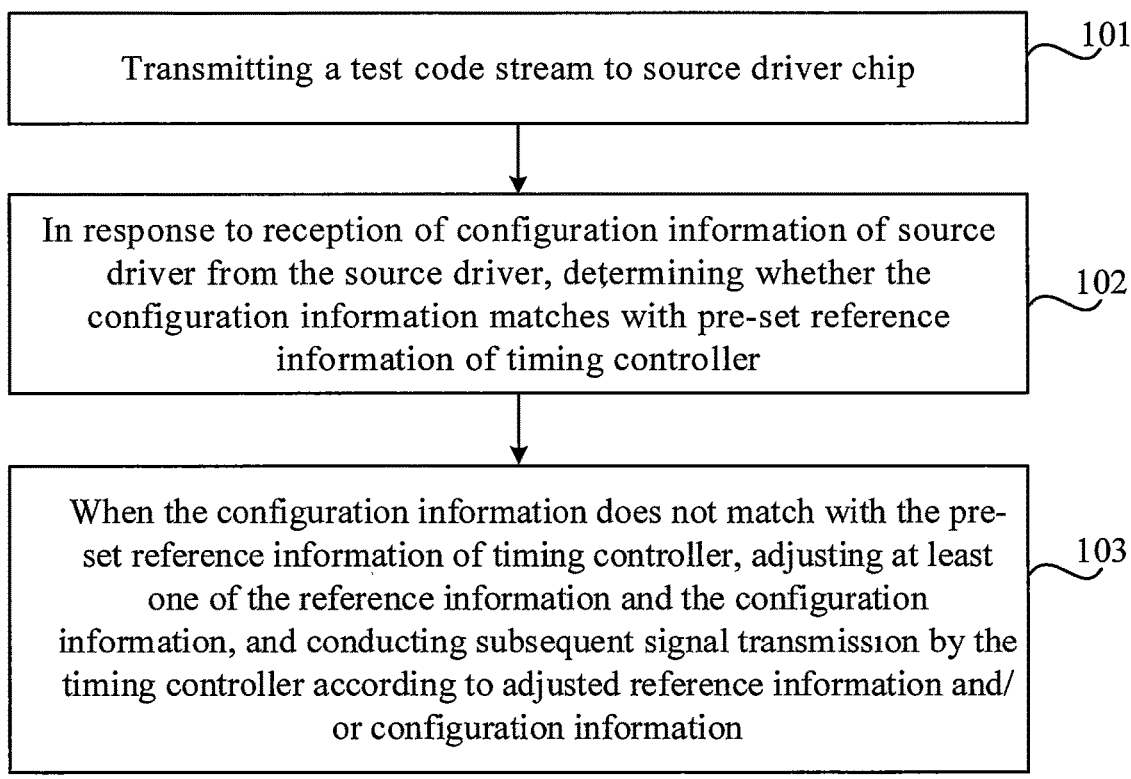
FIG. 2a is a flow chart of a signal detection method provided by one or more embodiments of the present disclosure.

FIG. 2a shows a flow chart of a signal detection method according to one or more embodiments. It would be understood that the method may be implemented in conjunction with any suitable hardware, software, firmware or the combination thereof. In at least some embodiments, the method may be implemented by software in the form of a computer readable instruction included in a certain type of computer readable storage medium, and the software may be executed under the influence of one or more processors. In one or more embodiments, the method may be implemented by, e.g., the timing controller 100 in an environment as shown in FIG. 1.

In Step 101, a test code stream is transmitted to a source driver. The test code stream is obtained through encoding of an initial code stream by a timing controller, which initial code stream represents a test signal. In an embodiment, the initial code stream may be generated by the timing controller. Alternatively, the initial code stream may be acquired from a memory.

In Step 102, in response to reception of the configuration information of the source driver from the source driver, it is determined whether the configuration information matches with pre-set reference information of the timing controller. The configuration information is transmitted when the source driver detects that the decoded code stream is different from the initial code stream. The decoded code stream is obtained by decoding the received test code stream by the source driver.

In an embodiment, the configuration information is information for configuring the source driver to receive a signal. The configuration information may comprise transmission-related parameters employed by the source driver during signal transmission with the timing controller. The pre-set reference information may comprise transmission-related parameters employed by the timing controller during signal transmission with the source driver. In an embodiment, determining whether the configuration information matches with reference information may comprise comparing the transmission-related parameters employed by the source driver and those employed by the timing controller so as to determine whether they coordinate or are consistent.

In Step 103, when the configuration information does not match with the pre-set reference information, the configuration information is adjusted according to the reference information, and the adjusted configuration information is transmitted to the source driver so that the source driver receives a subsequently transmitted signal according to the adjusted configuration information. In an embodiment, subsequent signal transmission comprises transmission of a test signal, namely a test code stream, or transmission of a data signal(s). The data signal(s) represents an image to be displayed by the display device.

In a method for signal detection according to one or more embodiments, the timing controller may receive the configuration information of the source driver so that the performed adjustment may simultaneously take into account both the pre-set reference information of the timing controller and the configuration information of the source driver that are related to signal transmission. This ensures that the adjustment is in favor of improving the signal transmission quality. As a result, the number of required adjustments is reduced, and then the times of transmitting the test code stream from the timing controller to the source driver are reduced, thereby improving the signal transmission efficiency.

Figure 2B:
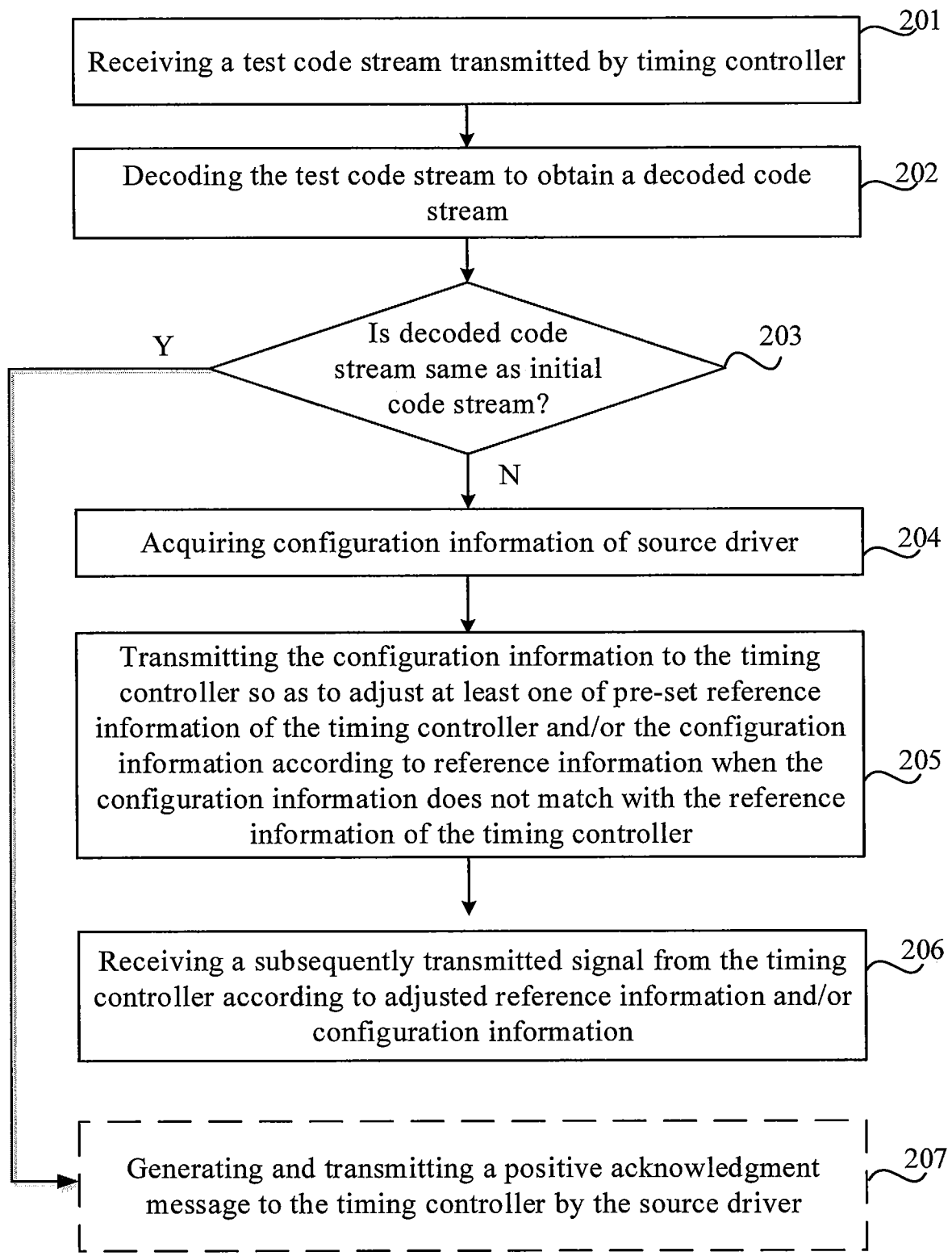
FIG. 2b is a flow chart of another signal detection method provided by one or more embodiments of the present disclosure.

FIG. 2b shows another method for signal detection according to one or more embodiments. It would be understood that the method may be implemented in conjunction with any suitable hardware, software, firmware or the combination thereof. In at least some embodiments, the method may be implemented by software in the form of a computer readable instruction included in a certain type of computer readable storage medium, and the software may be executed under the influence of one or more processors. In one or more embodiments, the method may be implemented by the source driver in an environment as shown in FIG. 1.

In Step 201, a test code stream transmitted by a timing controller is received. The test code stream is obtained through encoding of an initial code stream by the timing controller, which initial code stream represents a test signal.

In Step 202, the test code stream is decoded to obtain a decoded code stream.

In Step 203, it is detected whether the decoded code stream is the same as the initial code stream. In an embodiment, the source driver may detect whether the test code stream is the same as the initial code stream, i.e., whether the test code stream is correctly received, based on the recycling characteristics of the received test code stream. Alternatively, the source driver may implement detection based on a known initial code stream agreed with the timing controller.

In Step 204, when the decoded code stream is detected to be different from the initial code stream, the configuration information of the source driver is acquired.

In Step 205, the configuration information is transmitted to the timing controller so as to adjust the configuration information according to pre-set reference information of the timing controller when the configuration information does not match with the pre-set reference information.

In Step 206, the adjusted configuration information transmitted by the timing controller is received, and a subsequently transmitted signal(s) is received according to the adjusted configuration information.

In an embodiment, in Step 207, when the decoded code stream is detected to be the same as the initial code stream, the source driver generates and transmits a positive acknowledgment massage to the timing controller.

In a method according to one or more embodiments, the source driver may transmit the configuration information to the timing controller when the test code stream is not correctly received so that the performed adjustment may simultaneously take into account both the pre-set reference information of the timing controller and the configuration information of the source driver that are related to signal transmission. This ensures that the adjustment is in favor of improving the signal transmission quality. As a result, the number of required adjustments is reduced, and then the times of transmitting the test code stream from the timing controller to the source driver are reduced, thereby improving the signal transmission efficiency.

Figure 3:
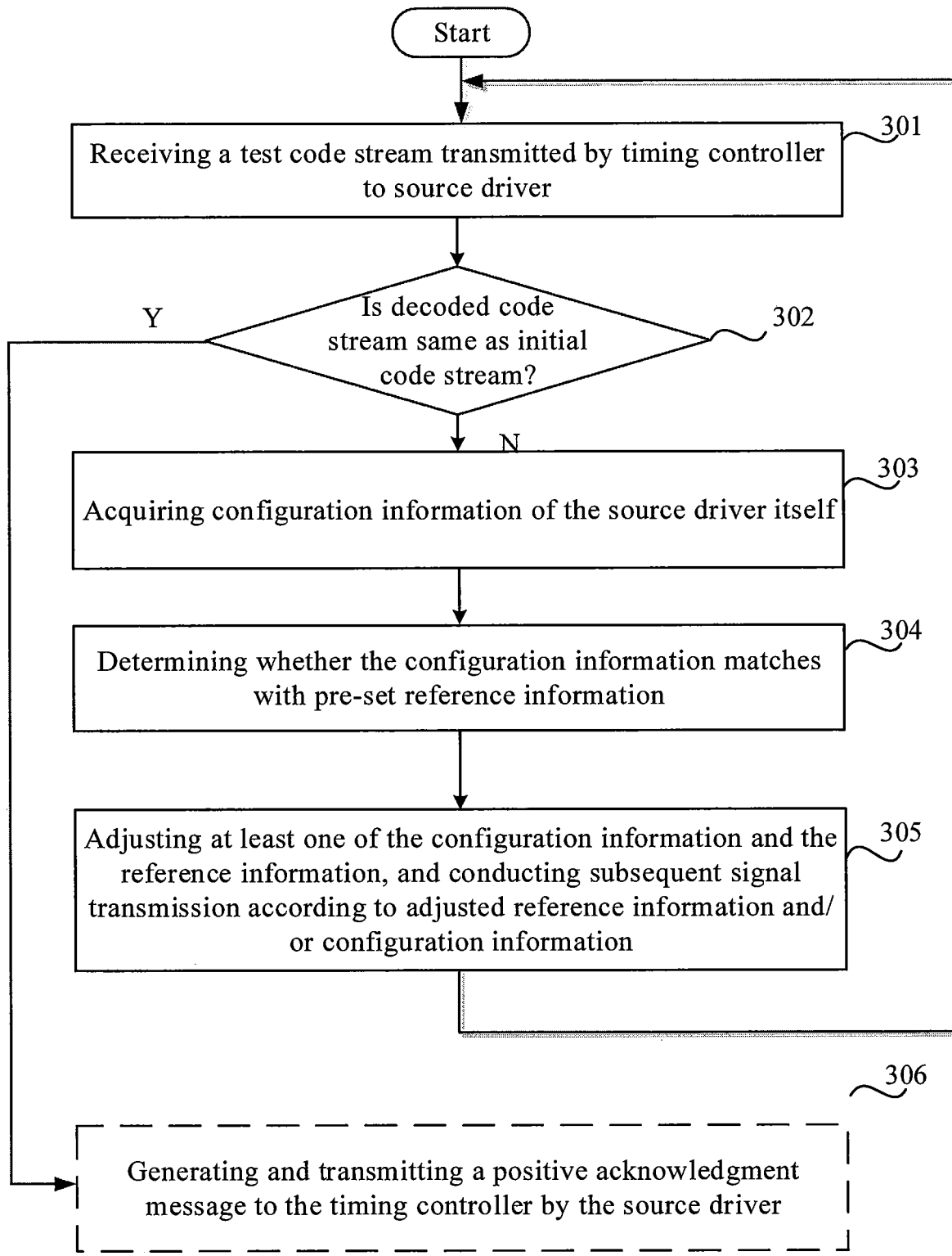
FIG. 3 is a flow chart of a further signal detection method provided by one or more embodiments of the present disclosure.

FIG. 3 shows a further method for signal detection according to one or more embodiments. The method may be implemented in conjunction with any suitable hardware, software, firmware or the combination thereof. In at least some embodiments, the method may be implemented by software in the form of a computer readable instruction included in a certain type of computer readable storage medium, and the software may be executed under the influence of one or more processors. In one or more embodiments, the method may be implemented by the timing controller and the source driver in an environment as shown in FIG. 1.

In Step 301, a test code stream transmitted from a timing controller to a source driver is received.

In an embodiment, the timing controller may first generate an initial code stream and then encode the initial code stream to obtain a segment of a binary test code stream. Alternatively, the initial code stream may also be obtained from a memory or generated by a generator outside of the timing controller. Thereafter, the timing controller transmits the obtained test code stream to the source driver.

Exemplarily, the initial code stream may be a binary random code stream. In an embodiment, the initial code stream is a pre-determined segment of the binary random code stream. The binary random code stream may be a pseudo random binary sequence (PRBS), such as PRBS7, code stream.

A PRBS code stream is generated by a PRBS pattern generator which generally consists of a linear feedback shift register and an XOR circuit. In the PRBS code stream, the binary digits "0" and "1" appear in equal proportions. The PRBS7 code stream is one type of PRBS code streams and is often used for signal detection in a serial bus. The PRBS7 code stream has a sequence length of 127 bits. In the PRBS7 code stream, the length of longest consecutive sequence of "1"s is 7 and the length of longest consecutive sequence of "0"s is 6.

The initial code stream may be encoded according to a type of clock data recovery (CDR) at a receiving end. For example, when the type of CDR is a Delay-Locked Loop (DLL), a jumping edge needs to be set at a fixed position in a data packet sent by a transmitting end, so that the receiving end recovers the clock and related data when the jumping edge is detected.

Taking the PRBS7 code stream as an example, the timing controller needs to encode the 127-bit PRBS7 code stream according to the type of CDR of the source driver. For instance, when the type of CDR is DLL, the timing controller sends a 9-bit code stream out of the 127-bit code stream each time. In order to generate a jumping edge, one bit is added to the 9-bit code stream to obtain a 10-bit code stream. The value of the added bit may be self-defined, for example, the value of the added bit may be determined according to the first bit of the following data packet. But one or more embodiments of the present disclosure are not limited thereto.

In Step 302, the source driver decodes the received test code to obtain a decoded code stream.

In an embodiment, taking the PRBS7 code stream as an example, since the timing controller adds one bit to every 9-bit code stream out of the 127-bit code stream to change it into a 10-bit code stream, the source driver needs to restore the 10-bit code stream to the initial 9-bit code stream at the time of decoding.

In Step 303, the source driver determines whether the decoded code stream is the same as the initial code stream. When the decoded code stream is different from the initial code stream, Step 304 is performed. When the decoded code stream is the same as the initial code stream, Step 309 is performed.

In one or more embodiments, in the case that the PRBS code stream is used as the initial code stream, "random" characteristic of a PRBS code is only in partial, i.e., the PRBS code is random within a cycle, and the code streams in individual cycles are completely the same, so the source driver may also determine whether the decoded code stream is the same as the initial code stream by: registering the decoded code stream for a cycle (parallel data); PRBS-encoding the registered decoded code stream; comparing the encoded data with the recently received test code, if they are consistent, it means the PRBS check is correct and the two code streams are the same. Otherwise, the source driver may determine that the decoded code stream is different from the initial code stream. Alternatively, the source driver may read an initial code stream agreed with the timing controller from the memory, and compare the initial code stream with the decoded code stream bit by bit to determine whether they are the same.

In Step 304, when the decoded code stream is detected to be different from the initial code stream, the source driver acquires its own configuration information.

The difference between the decoded code stream and the initial code stream indicates the source driver fails to correctly receive the test code stream. It may indicate that the signal transmission between the timing controller and the source driver doesn't meet the quality requirement and therefore needs to be adjusted. In an example, the configuration information acquired by the source driver may comprise a parameter related to the current signal transmission. In an embodiment, the configuration information may be at least one of the identity identifier of the source driver and the transmission rate of the current signal transmission. It would be understood that the source driver may also acquire any other configuration information that contributes to the adjustment of signal transmission. Embodiments are not limited to this context.

In Step 305, the source driver transmits the configuration information to the timing controller.

In an embodiment, in order to avoid information loss and enhance information accuracy, when receiving the configuration information of the source driver transmitted by the source driver, the timing controller may adjust a sampling frequency used for receiving information transmitted by the source driver to the highest value of one or more allowed sampling frequencies, so as to receive the configuration information transmitted by the source driver at the highest sampling frequency.

In Step 306, when determining the configuration information is different from the pre-set reference information, the timing controller adjusts the configuration information according to the reference information.

The pre-set reference information may be information related to the current transmission between the timing controller and the source driver. In an embodiment, the pre-set reference information comprises at least one of the identify identification and the transmission rate of the source driver used for current transmission.

The mismatch between the reference information and the configuration information may imply that the timing controller acting as the transmitting end and the source driver acting as the receiving end failed to work in coordination. At this time, in order to improve the signal transmission quality, it is advantageous to adjust the configuration related to the transmission between the timing controller and the source driver.

Exemplarily, when determining that the configuration information does not match with the pre-set reference information, the timing controller adjusts the configuration information to be consistent with the reference information. For instance, if the transmission rate of the source driver in the configuration information is 50 Mbps (Million bits per second) and the transmission rate of the source driver in the reference information is 100 Mbps, the timing controller may adjust the configuration information to be consistent with the reference information, e.g., adjust 50 Mbps to 100 Mbps.

In Step 307, the timing controller transmits the adjusted configuration information to the source driver. Taking the above-mentioned situation that the configuration information is the transmission rate of 50 Mbps as an example, after adjusting 50 Mbps to 100 Mbps, the timing controller transmits the adjusted 100 Mbps to the source driver, so that the source driver receives the signal to be transmitted at the transmission rate of 100 Mbps, thereby guaranteeing the signal transmission quality.

In Step 308, the source driver receives the subsequently transmitted signal according to the adjusted configuration signal.

In one or more embodiments of the present disclosure, when an error occurs in the signal transmission, the adjustment may be performed by simultaneously taking into account both the pre-set reference information of the timing controller and the configuration information of the source driver that are related to signal transmission, such that the timing controller and the source driver may better cooperate with each other to complete the transmission there between. This ensures that the source driver receives a correct signal more quickly, and then guarantees the signal transmission quality and improves the signal transmission efficiency.

In one or more embodiments, in Step 309, when the source driver detects that the decoded code stream is the same as the initial code stream, the source driver may generate a positive acknowledgment message and transmits the positive acknowledgment message to the timing controller. The positive acknowledgment message is used to indicate that the source driver correctly receives the signal transmitted by the timing controller.

The signal detection process may be implemented before the signal transmission or during the signal transmission.

In Step 310, the source driver transmits feedback information to the timing controller. The source driver transmits the generated positive acknowledgment information to the timing controller so as to notify the timing controller that: the source driver has correctly received the signal transmitted by the timing controller and will receive the subsequently transmitted signal according to the current configuration information.

The timing controller may initiate the transmission of a data signal in response to reception of the positive acknowledgment message. The data signal represents an image to be displayed by the display device.

It shall be explained that in one or more embodiments of the present disclosure, after Step 306 is performed, Steps 301 to 306 may be performed repeatedly. For instance, after the timing controller adjusts the configuration information of the source driver according to the reference information, if the source driver determines the decoded code stream is still different from the initial code stream representing the test signal, the source driver may acquire the configuration information of the source driver again and transmit the configuration information to the timing controller. The timing controller may again adjust the configuration information of the source driver. In one or more embodiments of the present disclosure, the timing controller may continuously adjust the configuration information, until the decoded code stream obtained by the source driver is the same as the initial code stream used by the timing controller.

It should be explained that the sequence of the steps of the method for signal detection according to one or more embodiments may be adjusted appropriately, and the steps may also be added or reduced as appropriate. Any one skilled in the art may readily conceive of a varied method within the technical scope disclosed in the present application. These methods shall come within the protection scope of the present application.

In the method for signal detection according to one or more embodiments, the timing controller may adjust the reference information and/or the configuration information based on the pre-set reference information and the configuration information fed back from the source driver, such that the source driver may receive the signal to be transmitted according to the configuration information that is consistent with the reference information. Since the adjustment may be performed by simultaneously taking into account both the pre-set reference information of the timing controller and the configuration information of the source driver that are related to signal transmission, the source driver does not need to perform multiple experimental adjustments. This may reduce the times of transmission of the test code stream from the timing controller to the source driver, and enable the source driver to receive a correct signal more quickly, which guarantees the signal transmission quality and improves the signal transmission efficiency.

Figure 4:
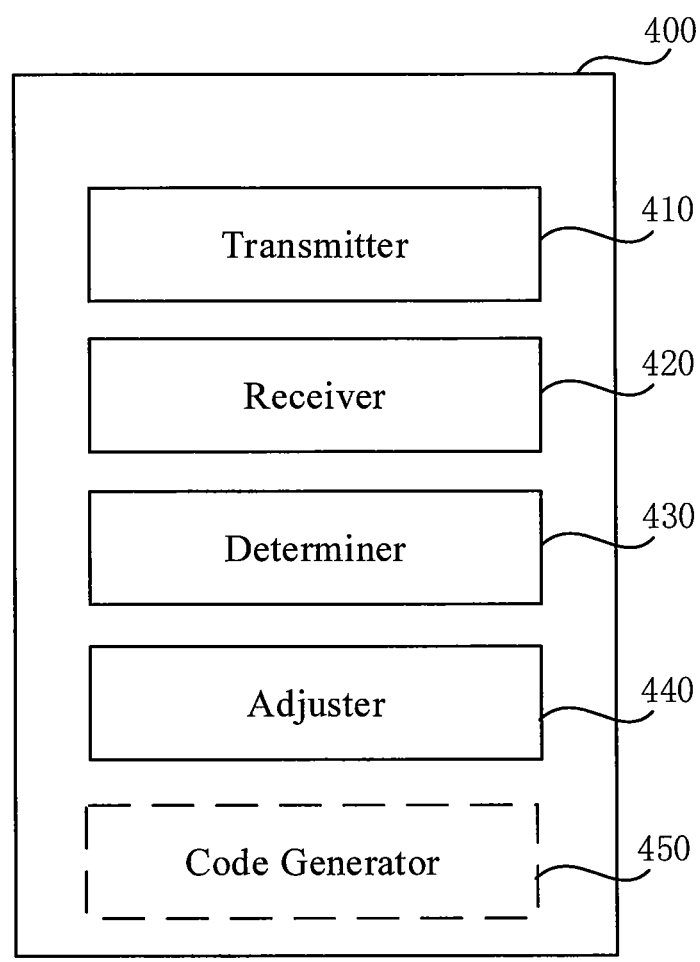
FIG. 4 is a structural schematic view of a signal detection component provided by one or more embodiments of the present disclosure.

FIG. 4 shows a signal detection component according to one or more embodiments, which may be applied in the timing controller 100 in the environment shown in FIG. 1. As shown in FIG. 4, the signal detection component 400 comprises: a transmitter 410, a receiver 420, a determiner 430 and an adjuster 440.

The transmitter 410 is configured to transmit a test code stream to the source driver, and the test code stream is obtained through encoding of an initial code stream by the timing controller, which initial code stream represents a test signal.

The receiver 420 is configured to receive confirmation information of the source driver transmitted by the source driver, and reception of the configuration information indicates that a decoded code stream obtained by decoding the test code stream by the source driver is different from the initial code stream.

The determiner 430 is configured to, in response to reception of the configuration information, determine whether the configuration information matches with the pre-set reference information of the timing controller.

The adjuster 440 is configured to, when the configuration information does not match with the pre-set configuration information, adjust the configuration information according to the reference information, and transmit the adjusted configuration information to the source driver so that the source driver receives a subsequently transmitted signal according to the adjusted configuration information.

In an embodiment, the configuration information comprises at least one of an identity identifier and a transmission rate of the source driver. In an embodiment, the receiver 420 is further configured to receive the configuration information of the source driver transmitted by the source driver at the highest sampling frequency.

In an embodiment, the receiver 420 is further configured to receive a positive acknowledgment message transmitted by the source driver. The reception of the positive acknowledgment message indicates that the decoded code stream obtained by the source driver is the same as the initial code stream, and therefore indicates that the source driver correctly receives the signal transmitted by the timing controller. Alternatively, the receiver used for receiving the positive acknowledgment message may be a separate receiver different from the receiver 420.

In one or more embodiments, the transmitter 410 initiates the transmission of the data signal after the receiver 420 received the positive acknowledgment message. Alternatively, the transmitter may also initiate the transmission of the data signal when a predetermined time interval expires and no information is received from the source driver.

In an embodiment, the signal detection component 400 may comprise a code generator 450 used for generating an initial code stream, such as a binary random code stream. In an embodiment, the binary random code stream is a PRBS7 code stream.

In the signal detection component according to one or more embodiments, it determines that the source driver does not correctly receive the code stream it transmitted according to the reception of the configuration information of the source driver, and then an adjustment is made based on the pre-set reference information and the received configuration information. Since the subsequent transmission is performed according to the adjusted, e.g. matched, reference information and/or configuration information, the source driver may correctly receive the subsequently transmitted signal more quickly, which improves the signal transmission efficiency.

Figure 5:
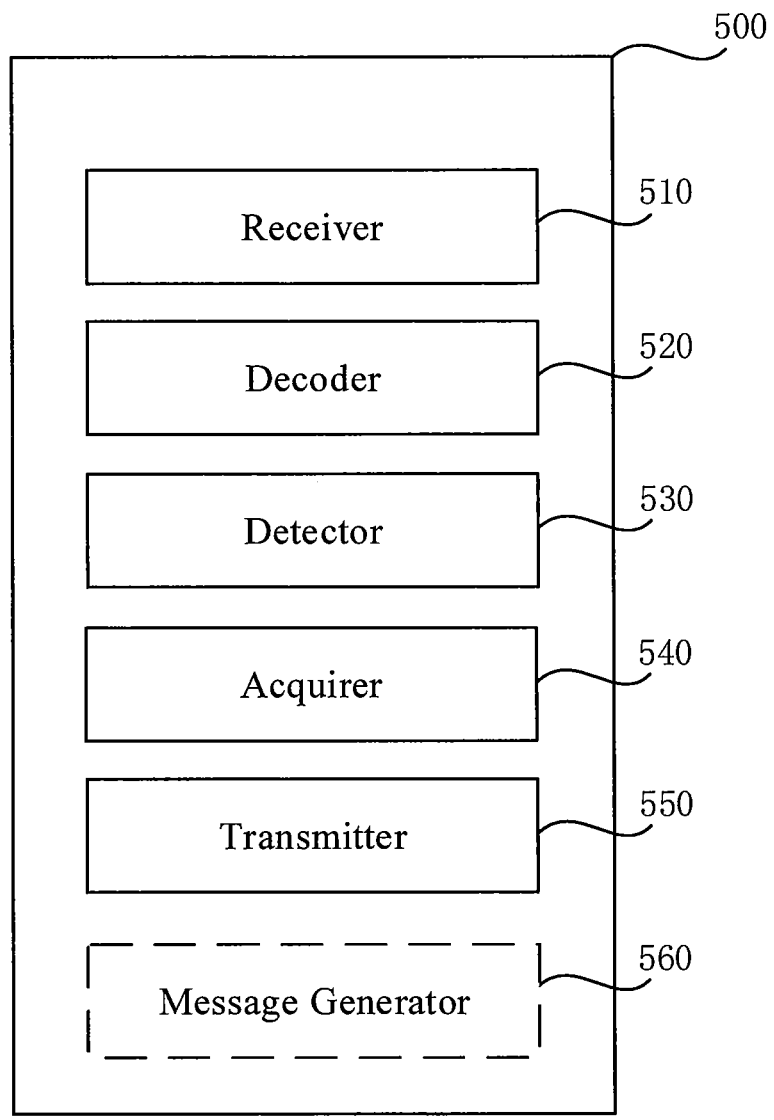
FIG. 5 is a structural schematic view of another signal detection component provided by one or more embodiments of the present disclosure.

FIG. 5 shows a signal detection component 500 according to one or more embodiments, which may be applied in the source driver 200 in the environment shown in FIG. 1. As shown in FIG. 5, the signal detection component 500 comprises: a receiver 510, a decoder 520, a detector 530, an acquirer 540 and a transmitter 550.

The receiver 510 is configured to receive a test code stream transmitted by a timing controller, and the test code stream is obtained through encoding of an initial code stream by the timing controller, which initial code stream represents a test signal.

The decoder 520 is configured to decode the test code stream to obtain a decoded code stream.

The detector 530 is configured to detect whether the decoded code stream is the same as the initial code stream.

The acquirer 540 is configured to, when the decoded code stream is detected to be different from the initial code stream, acquire configuration information of the source driver.

The transmitter 550 is configured to transmit the configuration information to the timing controller so that the timing controller adjusts the configuration information according to pre-set reference information when it is determined that the configuration information does not match with the reference information.

The receiver 510 is further configured to receive the adjusted configuration information transmitted by the timing controller, and receive a subsequently transmitted signal according to the adjusted configuration information.

In one or more embodiments, the receiver 510 is further configured to receive the adjusted configuration information from the timing controller; and the receiver 510 is further configured to receive the code stream from the timing controller according to the adjusted configuration information. Optionally, different receivers may be employed to receive the test code stream/data signal and the adjusted configuration information respectively.

In an embodiment, the configuration information comprises at least one of an identity identifier and a transmission rate of the source driver.

Furthermore, as shown in FIG. 5, the signal detection component further comprises a message generator 560 configured to generate a positive acknowledgment message when the decoded code stream is detected to be the same as the initial code stream. The positive acknowledgment message is used to indicate that the source driver correctly receives the signal transmitted by the timing controller. The transmitter 550 is further configured to transmit the positive acknowledgment message to the timing controller.

With the signal detection component according to one or more embodiments, the timing controller may pertinently adjust the transmission between the timing controller and the source driver when the test code stream is not received correctly. In this case, the source driver does not need to perform experimental adjustments multiple times. This reduces the times of transmission of the test code stream from the timing controller to the source driver and improves the signal transmission efficiency.

Figure 6:
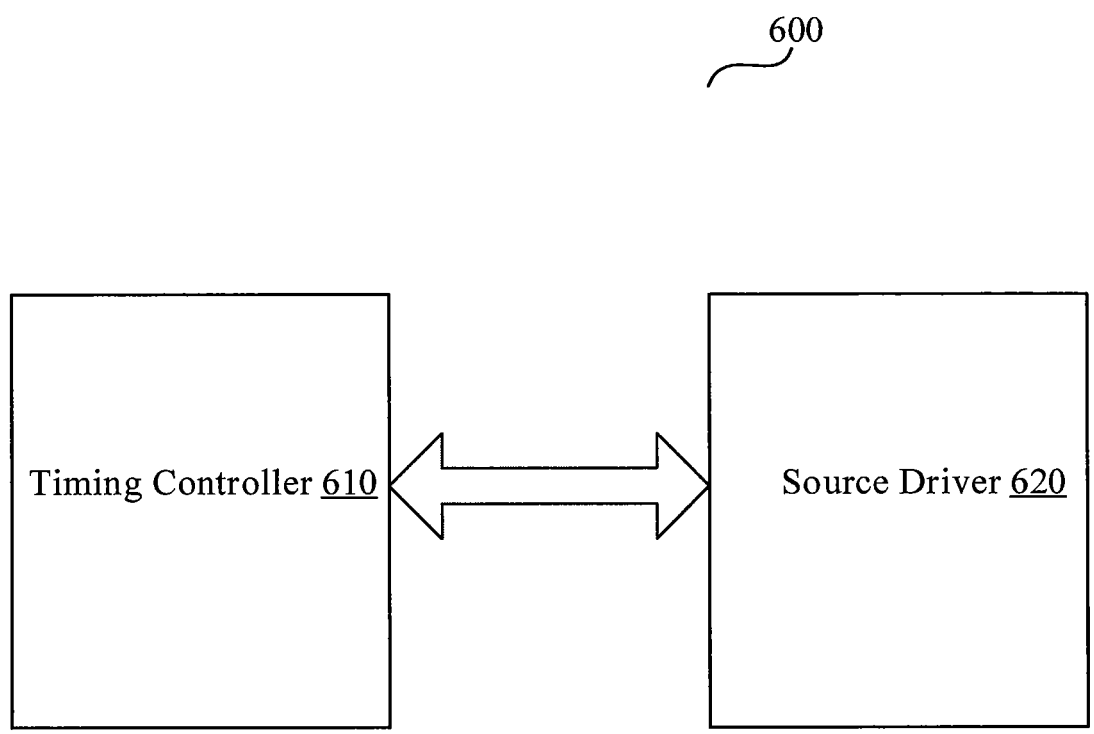
FIG. 6 illustrates a display device according to one or more embodiments of the present disclosure.

FIG. 6 shows a display device 600 according to one or more embodiments. The display device 600 comprises a timing controller 610 and a source driver 620.

The timing controller 610 comprises a signal detection component 612 according to one or more embodiments of the present disclosure, such as the signal detection component shown in FIG. 4.

The source driver 620 comprises a signal detection component 622 according to one or more embodiments of the present disclosure, such as the signal detection component shown in FIG. 5.

According to one or more embodiments, when the decoded code stream is different from the initial code stream representing the test signal, the source driver may acquire the configuration information of the source driver and transmit the configuration information to the timing controller. When the configuration information is different from the pre-set reference information, the timing controller adjusts the configuration information according to the reference information. Then, the source driver receives the adjusted configuration information transmitted by the timing controller, and receives the signal to be transmitted according to the adjusted configuration information. Therefore, the source driver does not need to perform experimental adjustments multiple times, and the timing controller does not need to transmit a signal to the source driver multiple times. Therefore, the signal transmission efficiency may be improved.

The display device 600 may be any product or component having a display function, such as a liquid crystal display device, electronic paper, an organic light-emitting diode (OLED) panel, a mobile phone, a tablet, a TV (such as a liquid crystal TV having a backlight brightness control system), a display, a laptop, a digital photo frame and a navigator.

The one or more embodiments of the present disclosure also provide a computer readable storage medium, which stores a computer executable instruction, which, when executed on a computer, causes the computer to perform the signal detection method according to the embodiment of the present disclosure, such as the method for signal detection as shown in FIG. 2a, 2b or 3. The example of the computer readable storage medium comprises a random access memory (RAM), a non-volatile memory (such as one or more of a read-only memory (ROM), a flash memory, an EPROM, an EEPROM) and a disk storage device. The disk storage device may be implemented as any type of magnetic or optical storage device, such as a hard disk drive, a recordable and/or rewritable compact disk (CD), or any type of digital universal disk (DVD). It is clear to those skilled in the art that, for the sake of convenient and concise depiction, reference may be made to the corresponding process of the above method embodiments for the specific working process of the devices and components described above, which will not be reiterated herein.

Other embodiments of the present application will be readily apparent to those skilled in the art after considering the description and implementing the invention disclosed herein. The present application is intended to cover any variation, use, or adaptive modification of the present application, which is in line with the general principles of the present application and includes the common knowledge or conventional technical means in the art that are not disclosed in the present disclosure. The description and examples are considered as exemplary only, and the real scope and spirit of the present application is indicated by the claims.

It shall be understood that the present application is not limited to the precise structures that have been described above and shown in the drawings, and may be altered and modified without departing from the scope thereof. The scope of the present application is only limited by the appending claims.

The invention claimed is:

1. A method for signal detection in a display device, the display device comprising a timing controller and a source driver, the method being applied to the timing controller and comprising:
    transmitting a test code stream to the source driver, the test code stream being obtained through encoding of an initial code stream by the timing controller, wherein the initial code stream represents a test signal;
    determining whether configuration information of the source driver matches with reference information of the timing controller in response to reception of the configuration information from the source driver, wherein the reception of the configuration information indicates detection by the source driver that a decoded code stream is different from the initial code stream, the decoded code stream being obtained by decoding the test code stream by the source driver; and
    adjusting the configuration information according to the reference information when the configuration information is determined to be different from the reference information, and transmitting the adjusted configuration information to the source driver so that the source driver receives a subsequently transmitted signal according to the adjusted configuration information.

2. The method according to claim 1, wherein the configuration information comprises an identity identifier and a transmission rate of the source driver.

3. The method according to claim 1, wherein the reception of the configuration information of the source driver from the source driver comprises:
    receiving the configuration information at a highest sampling frequency allowed by the timing controller.

4. The method according to claim 1, wherein after transmitting a test code stream to the source driver, the method further comprises:
    receiving a positive acknowledgment message from the source driver, wherein the positive acknowledgment message indicates detection by the source driver that the decoded code stream is same as the initial code stream; and
    initiating transmission of a data signal in response to the positive acknowledgment message.

5. The method according to claim 1, wherein the initial code stream is a binary random test code stream.

6. The method according to claim 5, wherein the binary random test code stream is a pseudo-random binary sequence PRBS7 code stream.

7. A non-transitory computer readable storage medium, which stores computer executable instructions, wherein when the executable instructions are executed on a computer, the computer performs the signal detection method according to claim 1.

8. A method for signal detection in a display device, the display device comprising a timing controller and a source driver, the method being applied to a source driver and comprising:
    receiving a test code stream from the timing controller, wherein the test code stream is obtained through encoding of an initial code stream by the timing controller, the initial code stream representing a test signal;
    decoding the test code stream to obtain a decoded code stream;
    detecting whether the decoded code stream is same as the initial code stream;

acquiring configuration information of the source driver when the decoded code stream is detected to be different from the initial code stream;

transmitting the configuration information to the timing controller so as to adjust the configuration information according to reference information of the timing controller when the configuration information does not match with the reference information; and receiving adjusted configuration information transmitted by the timing controller, and receiving a subsequently transmitted signal according to the adjusted configuration information.

9. The method according to claim 8, wherein the configuration information comprises an identity identifier and a transmission rate of the source driver.

10. The method according to claim 8, wherein after detecting whether the decoded code stream is the same as the initial code stream, the method further comprises:

generating a positive acknowledgment message when the decoded code stream is detected to be the same as the initial code stream; and transmitting the positive acknowledgment message to the timing controller.

11. A non-transitory computer readable storage medium, which stores computer executable instructions, wherein when the computer executable instructions are executed on a computer, the computer performs the signal detection method according to claim 8.

12. A display device comprising a timing controller and a source driver, wherein the timing controller comprises a first signal detection component that includes:

a first transmitter configured to transmit a test code stream to the source driver, the test code stream being obtained through encoding of an initial code stream by the timing controller, the initial code stream representing a test signal;

a first receiver configured to receive information from the source driver, the information comprising configuration information of the source driver, and reception of the configuration information indicating detection by the source driver that a decoded code stream is different from the initial code stream, wherein the decoded code stream is obtained by decoding the test code stream by the source driver;

a determiner configured to determine whether the configuration information matches with reference information of the timing controller in response to reception of the configuration information; and an adjuster configured to adjust the configuration information according to the reference information when the configuration information does not match with the configuration information, wherein the adjusted configuration information is transmitted to the source driver so that the source driver receives a subsequently transmitted signal according to the adjusted configuration information; and wherein the source driver comprises a second signal detection component that includes:

a second receiver configured to receive the test code stream from the timing controller;

a decoder configured to decode the test code stream to obtain a decoded code stream;

a detector configured to detect whether the decoded code stream is same as the initial code stream;

an acquirer configured to acquire configuration information of the source driver when the decoded code stream is detected to be different from the initial code stream; and a second transmitter configured to transmit the configuration information to the timing controller, wherein the second receiver is further configured to receive the adjusted configuration information transmitted by the timing controller, and receive a subsequently transmitted signal according to the adjusted configuration information.

13. The display device according to claim 12, wherein the configuration information comprises an identity identifier and a transmission rate of the source driver.

14. The display device according to claim 12, wherein the first receiver is further configured to receive the configuration information at a highest sampling frequency allowed by the first receiver.

15. The display device according to claim 12, wherein the first receiver is further configured to receive a positive acknowledgment message from the source driver, the positive acknowledgment message indicating detection by the source driver that the decoded code stream is the same as the initial code stream, and wherein the first transmitter is further configured to initiate transmission of a data signal in response to the positive acknowledgment message.

16. The display device according to claim 12, wherein the initial code stream is a binary random test code stream.

17. The display device according to claim 16, wherein the binary random test code stream is a pseudo-random binary sequence PRBS7 code stream.

18. The display device according to claim 12, wherein the configuration information comprises an identity identifier and a transmission rate of the source driver.

19. The display device according to claim 12, further comprising:

a generator configured to generate a positive acknowledgment message when the detector detects that the decoded code stream is the same as the initial code stream, wherein the second transmitter is configured to transmit the positive acknowledgment message to the timing controller.

* * * * *